United States Patent [19]

Katsuta

[11] 3,913,341

[45] Oct. 21, 1975

[54] LOW TEMPERATURE LIQUID STORAGE TANK OF THE INTERNAL HEAT INSULATING TYPE HAVING LEAKAGE DETECTING MEANS

[75] Inventor: Kihei Katsuta, Nagasaki, Japan

[73] Assignee: Mitsubishi Jukogyo Kabushiki Kaisha, Tokyo, Japan

[22] Filed: June 18, 1974

[21] Appl. No.: 480,578

[30] Foreign Application Priority Data
June 27, 1973 Japan.............................. 48-72643

[52] U.S. Cl. ........................ 62/49; 62/129; 73/40.7
[51] Int. Cl.² ......................................... F17C 13/02
[58] Field of Search ........... 73/40.7; 62/45, 49, 125, 62/129; 220/15

[56] References Cited
UNITED STATES PATENTS

| | | | |
|---|---|---|---|
| 3,110,156 | 11/1963 | Niemann................................. | 62/45 |
| 3,214,963 | 11/1965 | Schlumberger et al.............. | 73/40.7 |
| 3,280,620 | 10/1966 | Anderson............................ | 62/125 |
| 3,364,729 | 1/1968 | Yearwood........................... | 73/40.7 |
| 3,374,639 | 3/1968 | Burke et al. ............................ | 62/45 |
| 3,489,311 | 1/1970 | Folkerts et al....................... | 73/40.7 |

Primary Examiner—Carroll B. Dority, Jr.
Assistant Examiner—Ronald C. Capossela
Attorney, Agent, or Firm—Cushman, Darby & Cushman

[57] ABSTRACT

A low temperature liquid storage tank of the internal heat insulating type having leakage detecting means in which a liquid impermeable layer is provided on the inner surface of the tank shell with a heat insulating layer being interposed therebetween and a secondary barrier is provided in the interior of the heat insulating layer. A layer of gas permeable sheet material is located at the side of the heat insulating layer interior of the second barrier. The layer of the gas permeable sheet material is divided into a plurality of compartments through each of which circulating gas can be selectively introduced and lead to gas analyzing means so that the leakage, if occurs, can be detected by analyzing the gas.

1 Claim, 3 Drawing Figures

LOW TEMPERATURE LIQUID STORAGE TANK OF THE INTERNAL HEAT INSULATING TYPE HAVING LEAKAGE DETECTING MEANS

BACKGROUND OF THE INVENTION

The present invention relates to a tank of the internal heat insulating type for storing therein low temperature liquid such as liquefied natural gas, and more particularly, to a low temperature liquid storage tank of the internal heat insulating type having means for detecting the leakage of the low temperature liquid out of the tank, if such occurs.

In a low temperature liquid storage tank of the so-called internal heat insulating type in which a liquid impermeable layer is provided on the inner surface of the tank shell with a heat insulating layer being interposed therebetween, should the leakage of the low temperature liquid take place due to possible damage in the liquid impermeable layer, the portion of the tank shell near the portion at which leakage takes place is severely cooled so that breakage of the tank shell due to cold brittleness of the material of the tank shell might take place.

SUMMARY OF THE INVENTION

It is the object of the present invention to provide a novel and useful low temperature liquid storage tank of the internal heat insulating type having means for detecting quickly and without fail the leakage of the low temperature liquid due to possible damage in the liquid impermeable layer in the tank so that the serious breakage of the tank shell which might be caused by the leakage of the low temperature liquid is prevented from occurring.

To this end, the low temperature liquid storage tank of the internal heat insulating type having leakage detecting means in accordance with the present invention comprises a liquid impermeable layer applied to the inner surface of the tank shell with the interposition of a heat insulating layer therebetween and a secondary barrier provided in the interior of the heat insulating layer, the storage tank being characterized by a layer of gas permeable sheet material located in the heat insulating layer at the side thereof interior of the second barrier, the layer of gas permeable sheet material being divided into a plurality of major compartments bounded by impermeable partition members having through-holes communicating with a gas circulating pump as well as a gas analyzing device, each of the minor compartments constituting the respective major compartments being provided with supporting posts for maintaining gas permeability of each of the minor compartments, thereby permitting the portion at which leakage takes place to be detected by selectively circulating the gas in the respective major compartment.

With the above described low temperature liquid storage tank of the internal heat insulating type having leakage detecting means in accordance with the present invention, should breakage take place in the liquid impermeable layer located at innermost side on the tank shell so that the low temperature liquid commences to leak therethrough, the leaking liquid is temporarily stopped by the secondary barrier provided in the interior of the heat insulating layer and, at the same time, the leaking liquid is introduced into one of the major compartments formed in the layer of gas permeable sheet material at the inside of the second barrier adjacent to the portion at which leakage takes place, thus permitting the leaking portion to be quickly and accurately found out by circulating the gas through that major compartment adjacent to the leaking portion so as to analyze the circulated gas by the gas analyzing device.

The plurality of the major compartment are located horizontally in the low temperature liquid storage tank of the internal heat insulating type and they are located at portions in the tank where possible damage is likely generated, such as at each of the corners of the tank or at the portion around the base of the pump. The respective major compartment is constructed by connecting gas passage holes in each of the detecting layers of the minor compartments forming the respective major compartment.

In the low temperature liquid storage tank of the internal heat insulating type having leakage detecting means of the present invention, since the supporting posts are provided in each of the minor compartments constituting the respective major compartment of the layer of gas permeable sheet material so as to bear against the load of the low temperature liquid and the heat insulating layer for maintaining the gas permeability each of the minor compartments, the flow resistance of the circulating gas can be held substantially constant, thereby affording advantages that the circulation of the gas for detecting the leakage can be effected without any hindrance.

When leakage of the low temperature liquid occurs through cracks generated in the liquid impermeable layer contacting with the low temperature liquid or the heat insulating layer, such a leakage can be quickly and without fail detected by the present invention, thereby facilitating the detection of the leaking portion in a low temperature liquid storage tank of the internal heat insulating type in which it has been heretofore considered to be difficult to effect such a detection. After the leaking portion is detected, an emergency measure is taken, for example, the level of the low temperature liquid in the tank is temporarily lowered below the leaking portion so that the breakage of the tank shell due to cold brittleness of the material is prevented, thereby remarkably improving the security of the tank.

Since a plurality of supporting posts are provided in the layer of gas permeable sheet material, the compression thereof by the load of the liquid is prevented so that the gas permeability is maintained so as to enable the circulation of the gas therethrough to be properly effected without hindrance.

DETAILED DESCRIPTION OF THE PREFERRED EMBODIMENT

Figure 1:
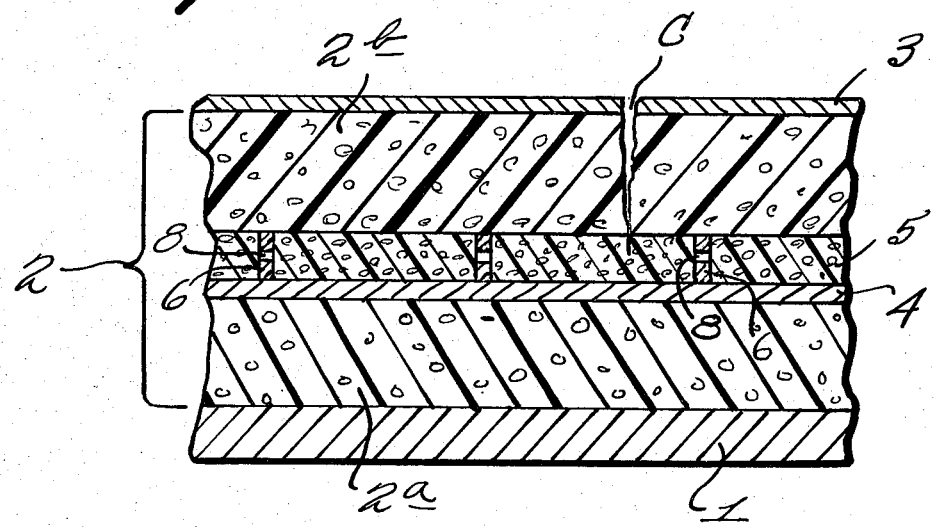
FIG. 1 is a fragmentary sectional view showing a part of the tank wall of the internal heat insulating tank having leakage detecting means of the present invention.

Referring to FIG. 1, a liquid impermeable layer 3 comprised of a low temperature resistant material is provided on the inner surface of the tank shell 1 with a heat insulating layer 2 made of a material such as foamed resin being interposed therebetween.

The heat insulating layer 2 consists of a first heat insulating layer section 2a at the room temperature side and a second heat insulating layer section 2b at the low temperature side, and a secondary barrier 4 is provided between the heat insulating layer sections 2a, 2b. These layers are secured to the inner surface of the tank shell 1 by means of fastening bolts located a distance spaced apart from each other.

A layer 5 of gas permeable sheet material is provided in the second heat insulating layer section 2b at the inside of the second barrier 4 in contact with the second barrier 4.

The layer 5 of gas permeable sheet material is divided into a plurality of minor compartments by partition members 6 of gas impermeable material. The partition members 6 are provided with through-holes 8 through which the ends of each of major compartments which are constituted by the plurality of minor compartments, respectively, communicate with a gas circulating pump and a gas analyzing device.

Figure 2:
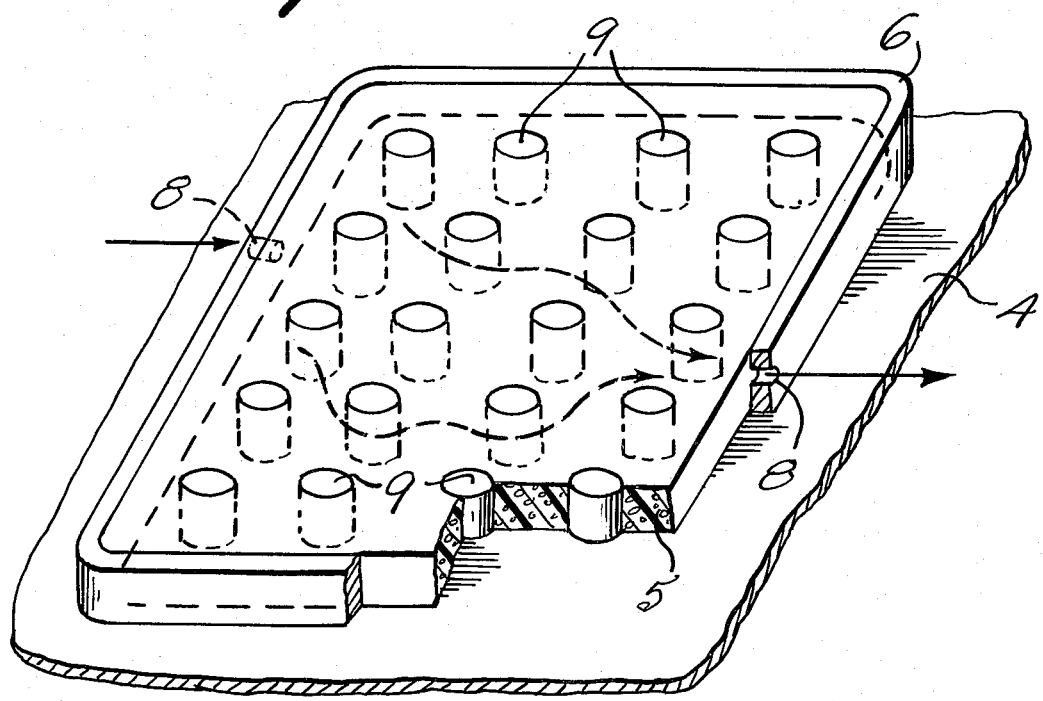
FIG. 2 is a fragmentary perspective view with a part broken away for the clear showing of the secondary barrier and the layer of gas permeable sheet material formed as the minor compartments which constitute the major compartment.

In FIG. 2, the layer 5 of gas permeable sheet material is made of a material such as soft polyurethane foam, for example, the size of the minor compartment formed by the layer 5 being in the order of 1.5m × 3m × 10mm.

The load of the low temperature liquid in the tank is applied to the bottom wall and the side walls of the tank. The layer 5 of gas permeable sheet material is in general weaker in mechanical strength than the material forming the heat insulating layer sections 2a, 2b, and therefore, tends to be compressed by the load of the liquid thereby remarkably deteriorating the gas permeability of the layer 5. In accordance with the present invention, a plurality of supporting posts 9 are arranged in the layer 5 in spaced relationship from each other in order to maintain proper gas permeability of the layer 5. These posts 9 are made of a material such as hard polyurethane foam, for example.

By the arrangement of the posts 9 in the layer 5 as described above, the load of the low temperature liquid as well as the second heat insulating layer section 2b is sufficiently born by the posts 9 so that the layer 5 of gas permeable sheet material is prevented from being compressed thereby permitting the flow resistance of leakage detecting gas through the layer 5 to be held substantially constant.

Figure 3:
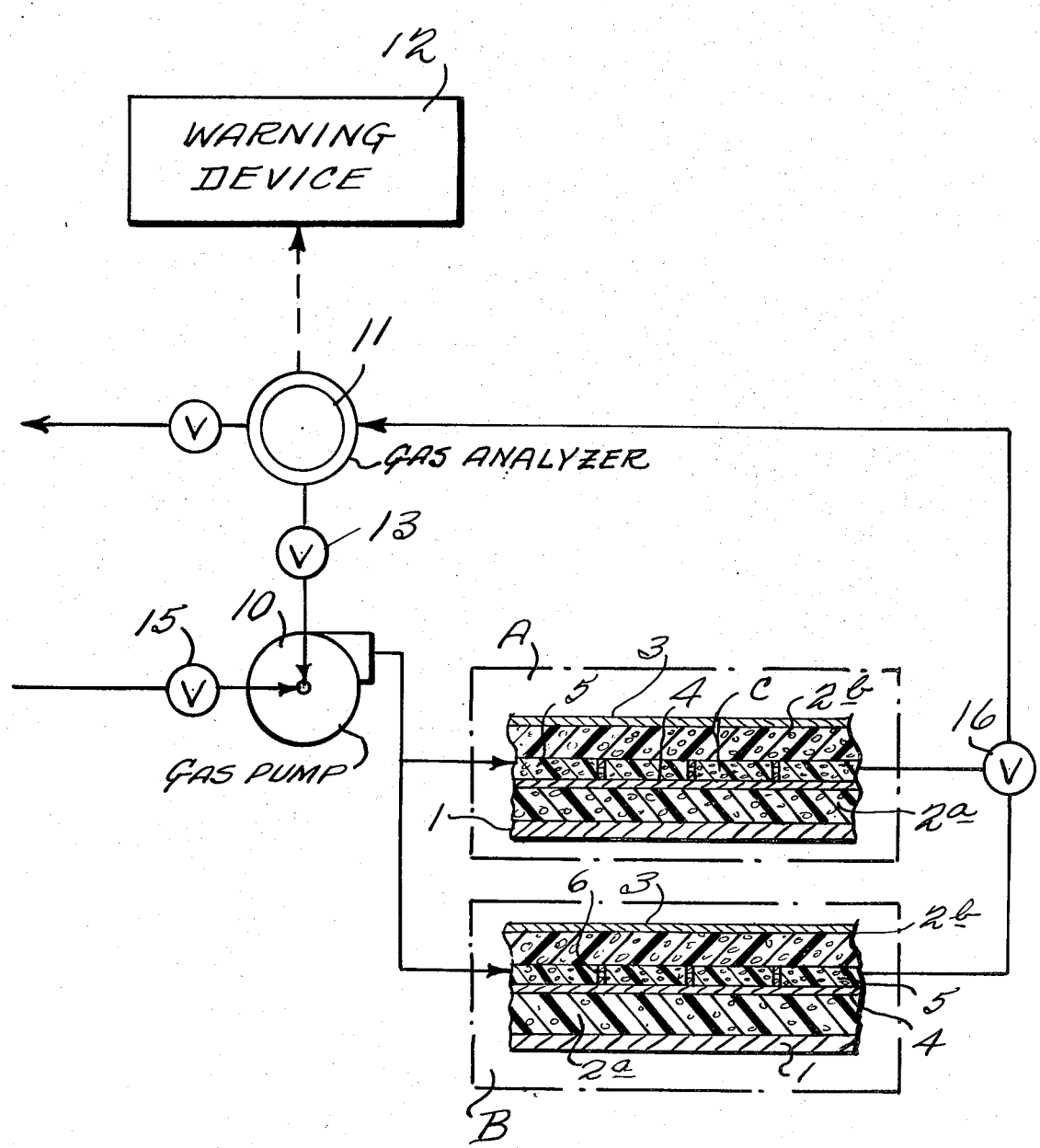
FIG. 3 is a block diagram showing the circuit of the leakage detecting means of the present invention.

Now, referring to FIG. 3, the area A encircled by chain line shows a major compartment of the layer 5 of gas permeable sheet material in a portion of the tank wall while the area B shows another major compartment. As shown, a crack C is generated in the liquid impermeable layer 3 and the second heat insulating layer section 2b in the area A, whereas no such crack is generated in the area B.

Dried nitrogen gas serving as the leakage detecting gas is supplied selectively to the major compartment A and the major compartment B through the electromagnetic valve 15 by the gas circulating pump 10, the switching of the supply of the gas being effected by the switch-over valve 16. The circulated gas is lead to the gas analyzing device 11. Thus, if the inclusion of vapor of the low temperature liquid in the detecting gas is not detected, the detecting gas is circulated to the pump 10 through the electromagnetic valve 13. In this case, the electromagnetic valve 15 is closed so as to avoid excessive consumption of the nitrogen gas and the heat loss.

Should, however, leakage of the vapor of the low temperature liquid take place through the crack C into the layer 5 of gas permeable sheet material, the leaking fluid is included in the nitrogen gas serving as the leakage detecting gas and reaches the gas analyzing device 11 so that the leakage of the low temperature liquid is detected thereby. A signal is generated by the gas analyzing device 11 when the leakage is detected, and the signal actuates the warning device 12 connected to the gas analyzing device 11 to issue an alarm.

By appropriately opening and closing the electromagnetic valves, the vapor of the low temperature liquid (such as the liquefied natural gas) detected as the leaking fluid is transported from the gas analyzing device 11 to a burning device exterior of the system such as flare stack so that it can be processed safely.

By arranging the major compartments of the layer 5 of gas permeable sheet material at appropriate locations in the tank, the detection of the leaking portion can be effected extremely accurately. If such a leakage is detected, the level of the low temperature liquid in the tank is lowered below the portion at which leakage takes place or the low temperature liquid is transported to another tank so as to avoid the danger and to maintain the tank in a safe condition.

Since the position at which leakage takes place is clearly and exactly detected in accordance with the present invention, the time and labor required for repairing the crack C are reduced to the minimum.

In case the crack C is fairly large, the low temperature liquid flows into the layer 5 of gas permeable sheet material in the liquefied state. However, since the flow resistance of gas in the layer 5 of gas permeable sheet material is kept substantially constant, the leaking fluid is gasified by the nitrogen gas and it is easily discharged out of the system in the gasified state thereby preventing the leaking liquid from being maintained in the interior of the second barrier 4 so that the security of the first heat insulating layer section 2a is insured.

I claim:

1. An internally thermally insulated low temperature liquid storage tank with leakage detecting means, comprising:

a tank shell;

a liquid impermeable layer lining the tank shell;

A layer of thermal insulation interposed between the liquid impermeable layer and the shell;

a secondary liquid impermeable barrier layer provided in the layer of thermal insulation, intermediate the thickness of the thermal insulation;

a layer of gas permeable sheet material located within the layer of thermal insulation next to the side of the secondary liquid impermeable barrier which faces inside the tank;

a plurality of gas impermeable partition members extending through the thickness of the gas permeable sheet material and dividing the gas permeable sheet material into a plurality of minor compartments;

the minor compartments being grouped into a plurality of major compartments;

a plurality of conduit means extending through the partition members, each conduit means serving to intercommunicate the minor compartments of a respective major compartment;

means for continuously pumping a supply of inert gas through selected ones of the respective major compartments via the respsective conduit means and for collecting said gas thereafter;

the collecting means including a gas analyzer for detecting the presence in the collected inert gas of leakage from the inside of the tank through the firstmentioned liquid impermeable layer into said gas permeable sheet within any major compartment;

minor compartment being provided with a plurality of rigid posts extending through the thickness thereof, these posts being spaced from one another and from the partition members within each minor compartment to prevent the flow of said inert gas therethrough from said conduit means to said collecting means; and the pumping means including automated control means connecting the pumping means to the gas analyzer and set to automatically increase the rate of pumping of inert gas through any major compartment into which the interior of the tank is sensed to be leaking, in order to carry away the leakage and so retard the progress of such physical damage as has resulted in the leakage.

* * * * *